No. 751,676. PATENTED FEB. 9, 1904.
C. D. NELSON.
FRUIT ELEVATOR.
APPLICATION FILED DEC. 3, 1902.
NO MODEL. 2 SHEETS—SHEET 1.
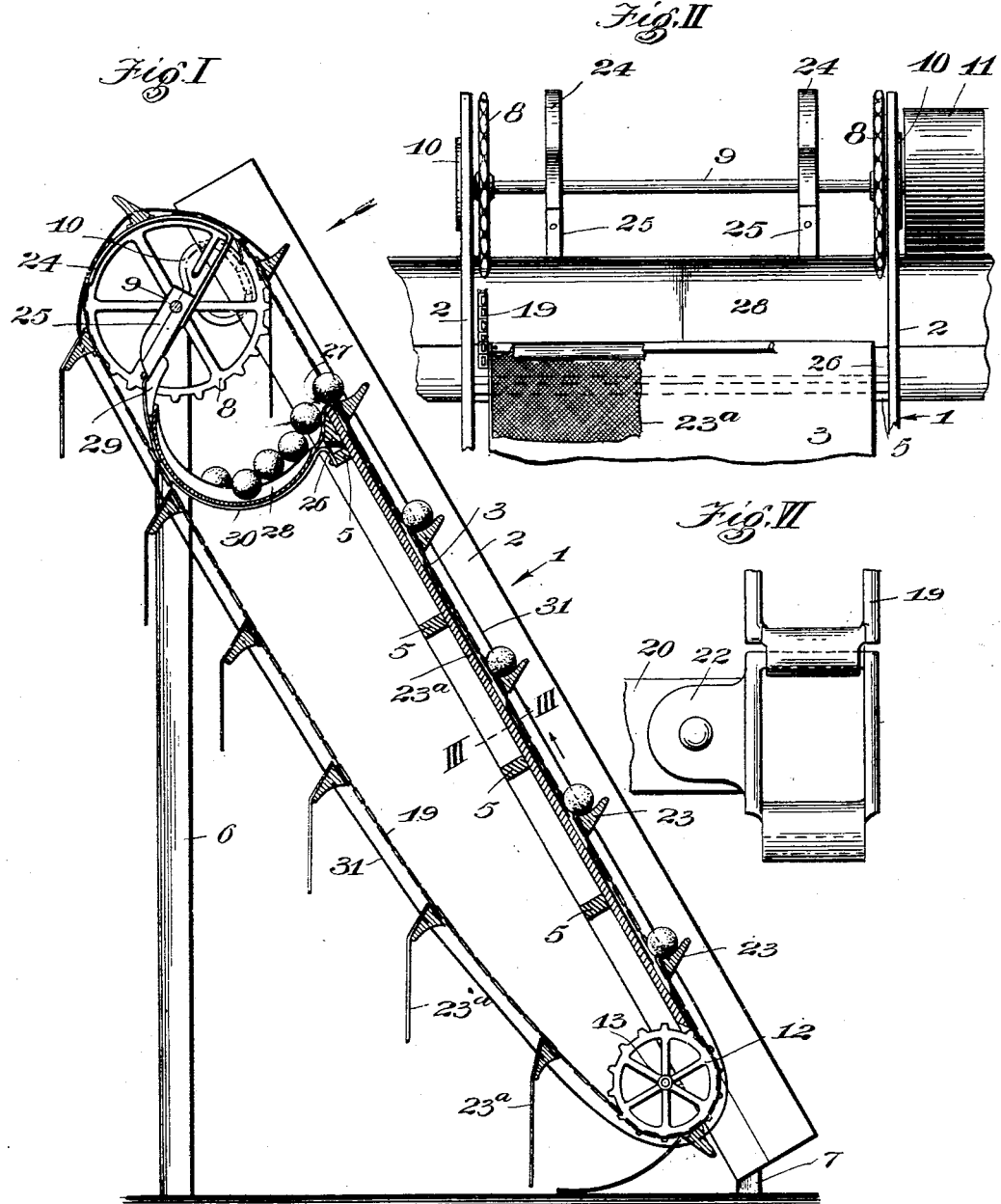
Witnesses
Inventor
Clinton D. Nelson No. 751,676. PATENTED FEB. 9, 1904.
C. D. NELSON.
FRUIT ELEVATOR.
APPLICATION FILED DEC. 3, 1902.
NO MODEL. 2 SHEETS—SHEET 2.
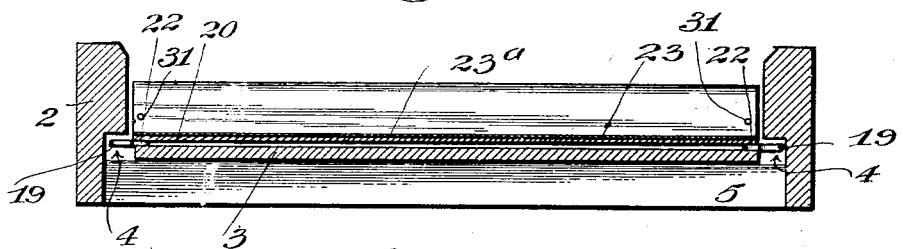
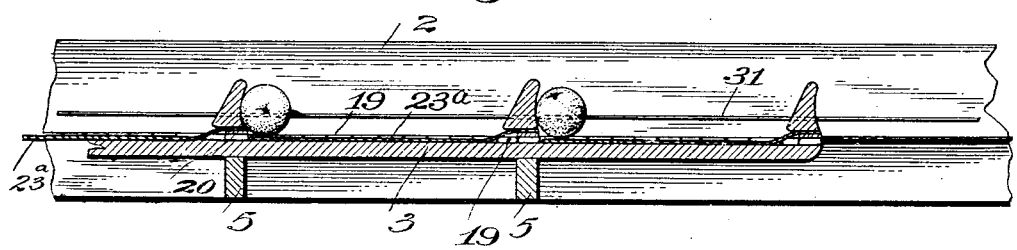
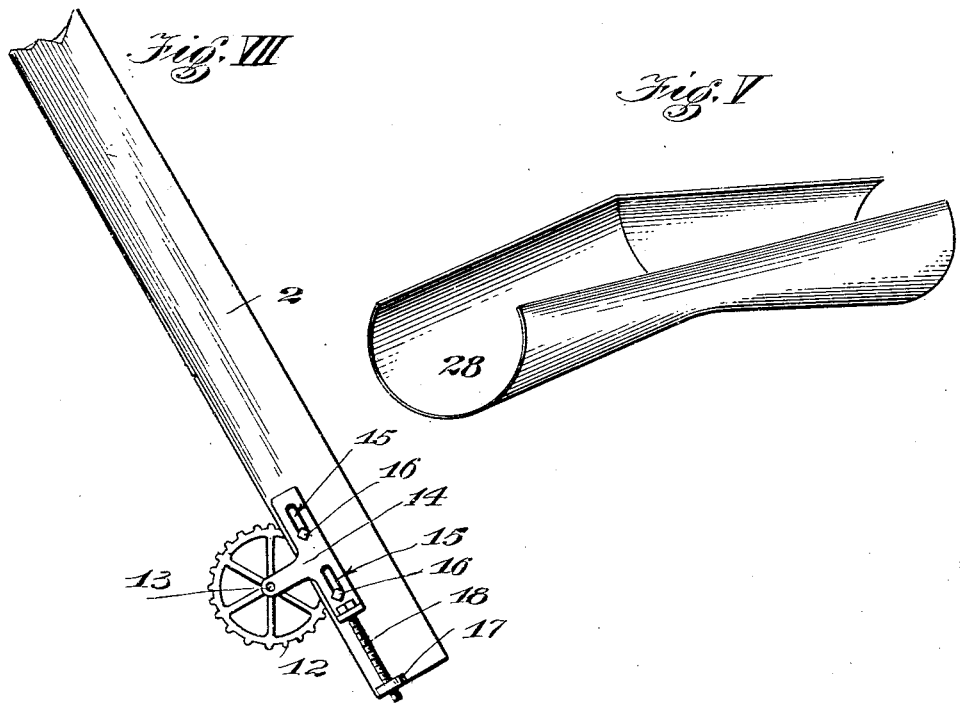
Witnesses
Inventor
Clinton D. Nelson
by Townsend Bros.
his attys.

No. 751,676. Patented February 9, 1904.

UNITED STATES PATENT OFFICE.

CLINTON D. NELSON, OF LORDSBURG, CALIFORNIA, ASSIGNOR TO H. K. MILLER MANUFACTURING COMPANY, OF GLENDORA, CALIFORNIA, A CORPORATION.

FRUIT-ELEVATOR.

SPECIFICATION forming part of Letters Patent No. 751,676, dated February 9, 1904.

Application filed December 3, 1902. Serial No. 133,773. (No model.)

*To all whom it may concern:*

Be it known that I, CLINTON D. NELSON, a citizen of the United States, residing at Lordsburg, in the county of Los Angeles and State of California, have invented new and useful Improvements in Fruit-Elevators, of which the following is a specification.

My invention relates to means for elevating fruit, and especially to that class of machines in which an endless carrier is provided for carrying up the fruit. Heretofore such elevators have been adapted to deliver fruit from their upper ends to a trough or spout placed in proximity to such end; but it has been found practically impossible to arrange the trough in sufficiently close relation to the endless elevator to prevent the fruit being caught between the end of the carrier and the edge of the trough, which causes a pinching and pressing of the fruit.

One object of my invention is to provide an improved means for discharging the fruit after it has been raised to the upper end of the trough, so as to minimize the liability of injury to the fruit.

Another object is to provide an improved means for fastening the conveyer-slats to the chains.

Other objects, such as simplicity of construction and effectiveness in operation, are attained, which will be fully set forth in the specification.

To these ends my invention comprises a traveler having an inclined ascending portion, pulleys for said traveler, a series of flights operating in connection with said traveler, a discharge-spout arranged adjacent to the lower side of said ascending portion, and a series of flexible sections for said traveler, said sections adapted to automatically discharge into the spout as they reach the same.

More specifically, the invention consists in a frame, endless chains mounted parallel on suitable operating means, flights carried by said chains and suitably spaced, a discharge-spout or trough arranged transversely of and beneath said chains between the upper and lower ends thereof, and a sectional carrier in connection with said chains and flights adapted to form the bottom of the elevator and adapted as they pass over said trough or spout to automatically discharge therein.

The invention consists, further, in various constructions and combinations of parts, all as herein described and more particularly pointed out in the claims, and will be more readily understood by referring to the drawings, in which—

Figure I is a side elevation of an elevator embodying my invention, the nearest side board being removed. Fig. II is a partial front elevation looking in direction of arrow in Fig. I. Fig. III is a transverse sectional view on line III III of Fig. I. Fig. IV is an enlarged fragmental longitudinal section through the trough. Fig. V is a perspective view of the discharge-spout. Fig. VI is a detail showing the manner of connecting the tie-strap to the chain. Fig. VII is a fragmental side elevation showing the means for adjusting the chain to take up slack.

Fruit-elevators are commonly provided with a continuous traveling belt, which carries transverse shelf-like slats for holding and raising the fruit, and when the fruit is raised to the top it is discharged over the top roller, which carries the belt onto a discharge-spout.

It has been found exceedingly difficult to arrange the discharge-spout in proper position with respect to the traveling belt or carrier to secure a good fit with the upper end of the carrier, and a gap usually occurs at that point, into which the fruit falls and gets pinched and bruised, thus injuring it. However slight this gap or space may be, it has been found that actual injury will occur.

In my elevator the fruit is discharged through the bottom of the trough directly onto a double discharge-spout without being carried around an end roller, the spout ultimately discharging the fruit laterally from opposite sides of the trough. I may use either a double discharge-spout or a single discharge-spout. I have shown and described a double discharge-spout having an inclined side adapted to receive the fruit without bruising it.

1 designates the trough in a general way, which consists of opposite upwardly-extending side boards 2 and a bottom 3. Each side board is undercut its entire length, as at 4, to form a recessed guideway for the ascending portion of the chain. Said side boards extend from the guideways to a point beyond the outer edges of the conveyer-slats, hereinafter described, thereby forming guards which effectually prevent the fruit from falling over the sides of the conveyer. The bottom board 3 is supported at intervals by means of cross-bar 5, attached to the side boards, the upper face of the bottom board being slightly below the upper corner of the undercut in each side board. The edges of the bottom board 3 are about in line with the inner faces of the side boards. The upper end of the trough may be supported by legs 6, while the lower end may be supported by legs 7. A pair of driving-sprockets 8, united by a shaft 9, are mounted under the upper end of the trough, the shaft 9 being supported by brackets 10, secured to the side boards. One end of the shaft may carry a pulley 11. A pair of idler-sprockets 12, united by an axle 13, are mounted under the lower end of the trough, the axle 13 being carried by brackets 14. The brackets 14 are slotted, as at 15, and secured to the side boards by clamping-screws 16. 17 represents stationary lugs attached to the side boards.

18 represents adjusting-screws adapted to work in threaded bearings of the lugs 17 and are pivotally connected with the brackets 15. By suitably adjusting the latter I secure the proper tension on the chains.

19 designates the chains, one of which is carried by the sprockets on each side of the trough. The chains are connected at intervals by tie-straps 20. At the point where the tie-straps are connected to the chains I provide a special link (shown in Fig. VI) which differs from the usual link in that it has a wing 22, which is preferably riveted to the end of the cross-tie 20.

23 designates the traveling conveyer-slats, one of which is screwed to each tie. The slats are substantially triangular in cross-section. The upper face against which the fruit rests is preferably concave and the projecting edge rounded to prevent damaging the fruit.

23$^a$ designates the flaps or sections of my sectional traveler. They are preferably of canvas, each flap being secured at one edge to the under side of a conveyer-slat and lying between the cross-tie and conveyer-slat, the screws which attach the cross-ties to the conveyer-slats also serving to hold the canvas flaps. Each flap is large enough to cover the rectangular space on the bottom board between each conveyer-slat and the side boards. When the cross-ties sweep over the upper face of the bottom board, they are slightly raised therefrom by the wings 22 of the attaching-links. This prevents the cross-ties from scraping the bottom board and eliminates friction. The canvas flaps in passing upward lie flat upon the bottom board and the fruit rests on the top of the flaps.

At the upper end of the trough I provide a pair of fingers 24, which are curved concentric with the driving-sprockets. Each finger is supported by a cross-bar 25.

The upper end of the bottom board terminates at a point below the driving-sprockets to leave a space through which the fruit may discharge. The upper edge of the bottom board is reinforced by a cross-bar 26 and rounded, as at 27.

28 is a trough, preferably of canvas, arranged beneath the space at the upper end of the bottom board. One edge of the trough may be attached to the bar 26. The other edge may be attached to a bar 29. The spout may be further supported by ribs 30, which latter may be attached to cross-bars 29 and 5. The cloth forming the spout is cut so that when the spout is attached the bottom slopes downward toward each end from the middle. (See Fig. V.)

A cord 31 is strung through each slat near the ends of the slats and provides a means for preventing the fruit from rubbing against the inside walls of the side boards 2.

When the driving-sprockets are rotated, the chains are driven and the conveyer-slats travel up the inclined trough, the fruit resting on top of the flaps 23$^a$ and against the concave surface of the conveyer-slats 23. When a conveyer-slat reaches the edge 27, the flap 23$^a$ of the preceding flaps on which the fruit rests drops and allows the fruit to roll into the spout 28. The resistance of the air causes the flaps 23$^a$ to swing down gently, and the fruit easily rolls down the flap 23$^a$ and into the spout 28, in which it rolls down toward each end and is discharged therefrom on each side of the trough. After a flap 23$^a$ drops in passing over the end of the bottom board of the trough and after the fruit has rolled off the flap further movement of the flap brings its under surface against the curved fingers 24, and the latter raise the flap up, so that as it starts on its return the flap will hang down along the flat face of the conveyer-slat. Unless the flap is supported during its passage through its circular path it would drop down over the concave face of the conveyer-slat and wind around the conveyer-slat, so that when it reached the lower end of the trough it would be wrapped around the wrong side of the conveyer-slat and would fail to lie out flat on the bottom board of the trough. The fingers 24 prevent this.

By making the flaps flexible I provide more space for the ascending fruit than would be afforded by rigid flaps, which would have to be permanently outcurved to conform to the peripheries of the pulleys. Another advantage of the flexible flap is that it lies flat upon the platform, so that the fruit moves up closer to the side of the discharge-spout, and therefore has less distance to fall when discharged into the spout and is for this reason less apt to bruise.

It is obvious that many modifications of my construction and many equivalents therefor will suggest themselves to one skilled in the art, and therefore I do not confine myself to the exact constructions shown or described, but reserve the right to make such variations in the specific construction herein set forth as will come within the scope of the claims.

Having thus described my invention, I claim as new and desire to secure by Letters Patent of the United States—

1. A fruit-elevator comprising rotating means, elevating means carried thereby, a trough or spout arranged between the ends of said means, flexible means in connection with said rotating means, forming the bottom of the elevator, adapted to automatically discharge the fruit into said trough or spout.

2. A fruit-elevator comprising a traveler having an inclined ascending portion, pulleys for said traveler, a series of flights operating in connection with said traveler, a discharge-spout arranged adjacent to the lower side of said ascending portion, and a series of flexible sections for said traveler, said sections adapted to automatically discharge into the spout as they reach the same.

3. A fruit-elevating apparatus comprising a frame, two endless chains mounted parallel to each other on rotating means, flights carried by said chains, a series of flexible sections having one end attached to said chains and the other free, a discharge trough or spout arranged transversely with respect to said chains and between the ends thereof, and a platform or bottom extending from the lower end up to the edge of said trough.

4. A fruit-elevating apparatus comprising a frame, two endless chains mounted parallel to each other on rotating means, flights carried by said chains, a series of canvas sections having one end attached to said chains and the other free, a discharge trough or spout arranged transversely with respect to said chains and between the ends thereof, and a platform or bottom extending from the lower end up to the edge of said trough and means for adjusting the length of said chains.

5. A fruit-elevator comprising an elevator or carrier, a discharge trough or spout arranged between the ends of and below said carrier and flexible flaps adapted to automatically deliver fruit through the bottom of said carrier to said trough as the fruit arrives on said carrier above the same.

6. In a fruit-elevator the combination, with a frame, of sprockets operatively mounted thereon, endless chains arranged parallel to each other on said sprockets, flights carried by said sprockets, a platform shorter than and over which said chains pass, a series of flexible flaps or sections carried by said chains between said flights and adapted to lie flat between the ascending fruit and said platform, and a trough or spout arranged below said chains and at the end of said platform, wherein said sections are adapted to discharge fruit.

7. The combination with a frame, of sprockets rotatably mounted therein, chains mounted on said sprockets, said chains provided with wings, flights and canvas flaps carried thereby and a transverse trough arranged below said chains between the ends of said frame, said flaps adapted to discharge fruit into said trough as said chains carry the flights thereover.

8. The combination, with a frame, of sprockets rotatably mounted therein, chains mounted parallel on said sprockets, a platform shorter than and extending below said chains, said chains provided with wings, slats attached thereto, sectional carriers and flights secured on said slats, said carriers extending between respective flights and adapted to rest on said platform, a transverse spout or trough arranged at the end of said platform whereinto said sectional carriers are adapted to deliver fruit.

9. A fruit-elevator comprising a frame, pairs of pulleys mounted thereon, an inclined endless conveyer carried by said pulleys, a platform provided with a shoulder below the upper end of the conveyer, a series of flexible flaps carried by said conveyer and adapted to lie extended upon the platform and shield the ascending fruits therefrom, said flaps having free ends adapted to swing inward across the shoulder, a discharge-spout between the pulleys and adapted to receive fruits from said shoulder, and means adapted to prevent the flaps winding around the conveyer-slat.

10. A fruit-elevator comprising a frame, pairs of pulleys mounted thereon, an inclined endless conveyer carried by said pulleys, a platform provided with a shoulder below the upper end of the conveyer, a series of flexible flaps carried by said conveyer and adapted to lie extended upon the platform and shield the ascending fruits therefrom, said flaps having free ends adapted to swing inward across the shoulder, a discharge-spout between the pulleys and adapted to receive fruits from said shoulder, and curved fingers adapted to prevent the flaps winding around the conveyer-slat.

11. A fruit-elevator comprising a frame, upper and lower pulleys mounted thereon, two endless chains mounted parallel to each other on said pulleys, a series of straps connecting said chains and attached to the outer faces of the links, a platform upon which the ascending links slide, a series of flexible flaps extending from the chain above the straps, a series of flights attached to the links by fasteners which extend through the straps and flaps, and a discharge-spout between the ascending and descending portions of the chains and adjacent to the upper end of the platform.

12. In a fruit-elevator provided with an endless conveyer mounted on pulleys, a series of open-ended flights carried by said conveyer, a platform having a bottom upon which the ascending portion of said conveyer slides, side boards adjacent to the ends of said flights, and a cord fastened to the end portions of the flights, and adapted to prevent the fruit from rubbing against the inside walls of the side boards.

13. A fruit-elevator comprising an endless carrier mounted on suitable pulleys, a discharge-spout between the ascending and descending portions of said carrier, said spout having an inclined side extending up to the side of the ascending portion of the carrier, and flexible depending flaps adapted to automatically deliver fruit through the bottom of said carrier to the inclined side of said spout as the fruit arrives on said carrier above the same.

14. The combination, with a frame, of sprockets rotatably mounted therein, chains mounted parallel on said sprockets, said chains provided with wings, slats attached to said wings, flights secured to said slats, a platform adapted to sustain the ascending portion of the chains, side boards for said platform and having undercuts in which said chains move, and a spout or trough adjacent the upper end of said platform whereinto said flights are adapted to deliver fruit.

In testimony whereof I have signed my name to this specification, in the presence of two subscribing witnesses, at San Dimas, in the county of Los Angeles and State of California, this 19th day of November, 1902.

CLINTON D. NELSON.

Witnesses:
W. A. JOHNSTONE,
J. E. McFADDIN.